United States Patent [19]

Gudmestad et al.

[11] 3,951,016

[45] Apr. 20, 1976

[54] ROTARY WIRE STRIPPING APPARATUS

[75] Inventors: Ragnar Gudmestad, West Allis; Leon J. Gorski, New Berlin; Gerald E. Blaha, Waukesha, all of Wis.

[73] Assignee: Artos Engineering Company, New Berlin, Wis.

[22] Filed: Sept. 2, 1975

[21] Appl. No.: 609,298

[52] U.S. Cl. .......... 81/9.51
[51] Int. Cl.² .......... H02G 1/12
[58] Field of Search .......... 81/9.51

[56] References Cited

UNITED STATES PATENTS

| | | | |
|---|---|---|---|
| 3,838,612 | 10/1974 | Inami | 81/9.51 |
| 3,853,156 | 12/1974 | Folkenroth | 81/9.51 |
| 3,881,374 | 5/1975 | Gudmestad | 81/9.51 |

*Primary Examiner*—James L. Jones, Jr.
*Assistant Examiner*—Roscoe V. Parker
*Attorney, Agent, or Firm*—James E. Nilles

[57] ABSTRACT

A rotary wire stripping machine for removing insulation from the end of an insulated wire including a reciprocating carriage which supports a rotating stripping head. The rotating stripping head includes a central bore for receiving the end of a wire and a pair of cutting blades which are movable radially inwardly to cut the insulation of the end of the wire. The reciprocating carriage may be moved from a first position wherein the stripping head receives the end of the wire to a second position wherein the blades pull insulation off the end of the wire.

9 Claims, 5 Drawing Figures

ROTARY WIRE STRIPPING APPARATUS

BACKGROUND OF THE INVENTION

This invention relates to wire strippers for removing insulation material from the ends of wires and particularly to wire strippers having a rotary cutting motion. The invention includes improvements in the structure of the rotary wire strippers disclosed in U.S. Application Ser. No. 473,274, filed May 24, 1974 by Gudmestad, entitled "Rotary Wire Stripper" from issued 1975 as Pat. No. 3,881,374 and U.S. Application Ser. No. 557,618, filed Mar. 12, 1975, and now U.S. Pat. No. 3,921,472 both of said applications being assigned to an assignee in common with this application.

SUMMARY OF THE INVENTION

The present invention is directed to a mechanism for stripping a predetermined length of insulation from the ends of wires or coaxial cables as they are advanced to a wire stripping mechanism by a conveyor mechanism and to form a finished end on the wire facilitating further assembly processes. The apparatus of the present invention provides means to strip insulation from a variety of wire types having varying diameters and insulation of varying thicknesses including coaxial cables.

The rotary stripping machine of the present invention is designed to function in association with a wire cutting and conveying apparatus which has means for severing established lengths of wire from a collar and conveying these cut lengths to a wire working station such that the wire is axially aligned with the rotary stripper and firmly clamped in position with an end exposed.

The rotary stripping machine includes a rotatable stripping head containing cutting blades and is reciprocable from a disengaged position to a position where the head member engages the end of the wire and cuts insulation therefrom. The rotatable stripping head is rotatably driven about an axis which is generally the same as that of the wire to be stripped. The stripping head includes a central chamber for receiving the end portion of the wire, a pair of blades which are radially slideable into the chamber, and pivotable cams which can function to force the blades into contact with the insulation. An annular collar member is provided surrounding and axially movable with respect to the stripping head, the collar member being connected to a yoke which is in turn connected to a fluid driven actuating member. The combination of the fluid driven actuating means, yoke and axially slideable collar provide means for camming the cutting blades into cutting engagement.

The present invention also includes a central tube member received within the rotating stripping head which functions to facilitate removal of the insulation stripped from the end of the wire. The end of the tube opposite that located within the stripping head is connected to a source of fluid flow which in turn causes fluid flow through the tube to permit removal of the waste insulation.

The present invention has the advantage of providing a rotary stripping head having a much simpler structure than the prior art apparatus by providing a less complicated means for actuating the cutting blades. The structure of the stripping head also facilitates the use of vacuum means to remove the insulation which has been stripped from the wires in such a manner that it does not impede the operation of the machine. The present invention also provides an adjustment means for varying the position of the cutting blades which is readily accessible and which facilitates extremely accurate adjustment. Further advantages of the invention are set out in the following description of an embodiment of the invention.

DESCRIPTION OF A PREFERRED EMBODIMENT

Figure 1:
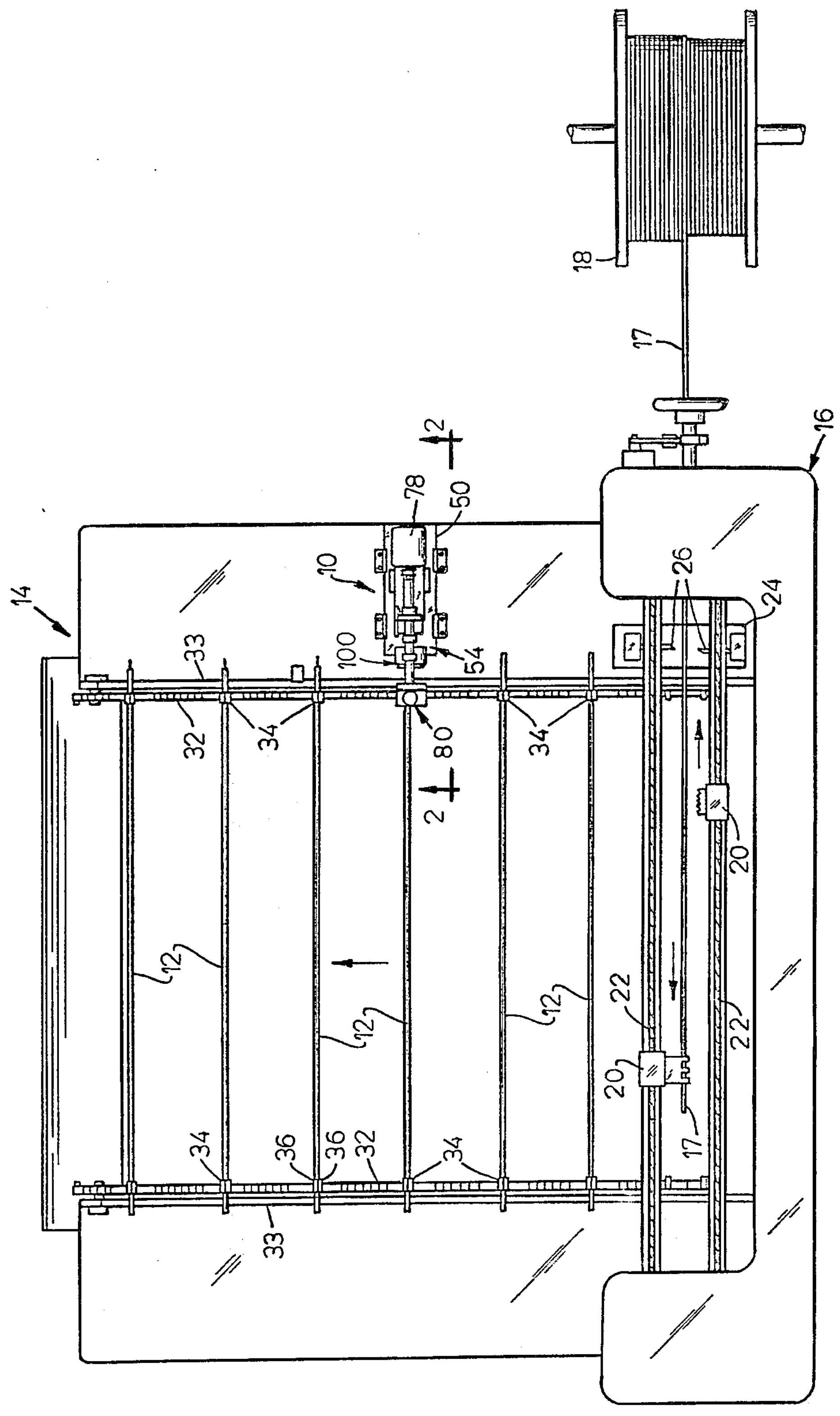
FIG. 1 is a plan view of a wire cutting and conveying machine incorporating the rotary stripping apparatus of the present invention.

Referring to FIG. 1, the invention is embodied in a rotary wire stripping machine 10 that is adapted to cut insulation from the end of a length of a cable or wire member 12 and to pull the cut material and insulation from the end of the wire.

Wire members 12 are advanced in succession along a path by a wire conveying machine 14 which in turn receives the wire members 12 from a wire feeding and cutoff machine 16. The machine 16 operates to withdraw the end of an insulated wire 17 from a supply on a reel 18. The conveyor 14 and wire feeding and cutoff machine 16 are generally of the type shown and described in detail in U.S. Pat. No. 3,029,494.

In general, the wire feeder and cutoff machine 16 includes a pair of oppositely reciprocating wire feeding clamps 20 secured in fixed position to cables 22 which are driven in a manner to move the clamps 20 transversely to the direction of movement of the conveyor 14 and at one end of the latter. The clamps 20 move past a wire cutting mechanism 24 located at one end of the feed and cutoff machine 16 and at one side of the conveyor machine 14.

The clamps 20 are adapted to be opened and closed in timed relation with the various other mechanisms. In operation the clamps 20 travel in opposite directions past each other and past the wire cutoff mechanism 24. One of the clamps 20 is closed to grip the free end of the wire stock 17 and pull the wire from the supply reel 18 while the other clamp 20 remains open during its return an equal distance in the opposite direction to a starting position beyond the cutoff mechanism 24. When the end of the wire 17 is moved to the end of its feed stroke, the other clamp 20, which is adjacent the cutoff mechanism, grips the end of the incoming wire stock 17. At the end of each such feeding stroke, and while both the clamps 20 remain closed, the knives 26 are actuated to sever a length of wire 12 from the wire stock 17. Thereafter, the clamp 20 which has completed its feeding stroke is opened and returned as the other clamp 20 remains closed to feed the free end of the wire supply 17 past the knives 26.

The conveyor 14 for receiving the cut lengths of wire or wire members 12 includes a pair of endless conveyor chains 32 which are simultaneously driven in a suitable manner in timed relation with the wire feeding and cutoff mechanism 26 to intermittently advance the wire members 12 from one work station to another. Each of the chains 32 is supported on a rail or frame 33 so that the upper run of each of the conveyor chains 32 is maintained in a generally horizontal position during its movement. Each of the chains 32 carries a series of wire grippers 34 spaced apart equal distances to maintain the wire members 12 in parallel relationship as they travel from one work station to another and from one end of the conveyor machine 14 to the other. The jaws of the wire grippers 34 of the two conveyor chains 32 are simultaneously operated in timed relationship with the wire feed and cutoff mechanism 16 as described in detail in U.S. Pat. No. 3,029,494.

As the pair of grippers 34 supported on the chains 32 approach the work station or zone in which the wire members 12 are being formed from the wire stock 17, the jaws 36 of the grippers are in an open position. As each wire severing operation is being conducted, the jaws 36 of the grippers 34 at opposite sides of the conveyor 14 and adjacent to the wire 17 are moved to a closed position to simultaneously grip the wire 17. After the wire 17 is severed into a wire member 12 of predetermined length, the grippers 34 at each end of the wire member 12 move to convey the wire member 12 to the next work station at the same time a new wire severing cycle is begun.

Figure 2:
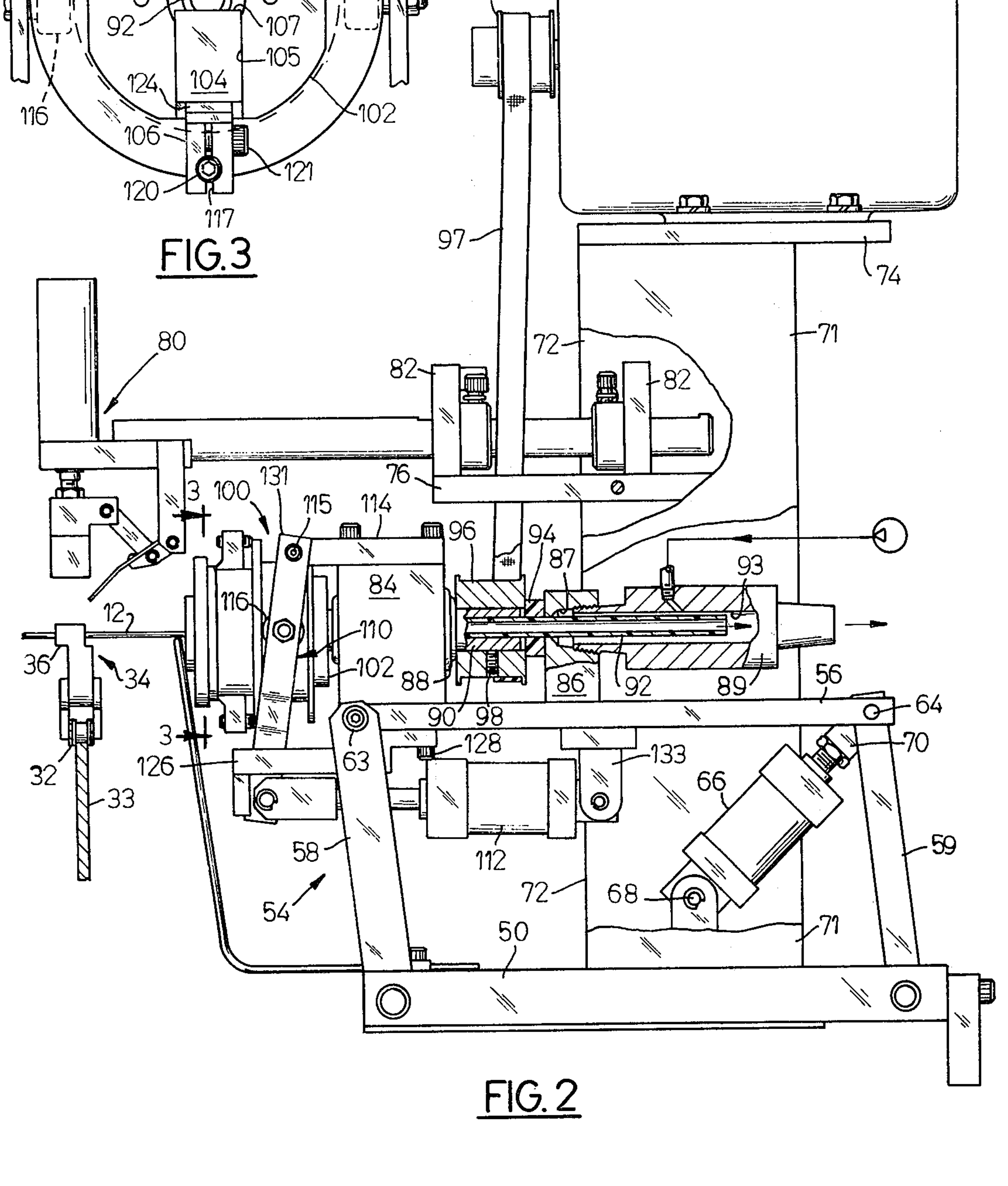
FIG. 2 is an enlarged side elevation view of the rotary stripping apparatus taken along line 2—2 in FIG. 1.

As shown in FIG. 2, the wire stripping machine 10 includes a base 50 which may be securely mounted in a selected position at one of the wire working stations on the wire conveying machine 14 which advances the wire members 12 from station to station. A rotary cutting and stripping assembly 54 is supported on a carriage or table 56 for generally horizontal movement relative to the base 50 from a rearward position to a forward position as shown in FIG. 2. In the latter position the stripping machine 10 is positioned to receive the end of the wire 12 and to perform its stripping operation.

The carriage 56 is supported in an elevated position above the base 50 by arms 58 and 59. The lower ends of the arms 58 and 59 are pivotably connected to the base 50 and the upper ends of the arms are pivotably connected to the carriage 56 by pins 63 and 64, respectively. The arms 58 and 59 serve to support the carriage 56 for generally horizontal reciprocating movement relative to the stationary base 50 between a wire engaging position shown in FIG. 2 and a retracted position (not shown) wherein the carriage 56 is positioned to the right of the position shown in FIG. 2. The carriage 56 can be reciprocated between the forward and rearward positions by means of a double-acting air actuator 66 which has its cylinder end portion pivotably connected by means of a pin 68 to the base 50. The piston rod end of the air actuator 66 is provided with a connecting element 70 which is connected to the pin 64 supporting the upper end of the arm 59 to the carriage 56. In the extended position of the air cylinder 66 the carriage 56 is maintained in spaced relation with respect to the end of the wire member 12 and, upon retraction of the cylinder 66, the carriage 56 is moved to the wire working position shown in FIG. 2.

The machine 10 also includes rigid vertically extending opposed mounting brackets 71 and 72 which support horizontal mounting plates 74 and 76. Horizontal mounting plate 74 rigidly supports an electric motor 78 which serves to continuously rotate the wire stripping mechanism during the stripping operation. Horizontal mounting plate 76 supports mounting members 82 which in turn support the cantilevered clamp locking assembly 80 to be described hereafter.

Rotary Stripping Assembly

The rotary stripping assembly 54 is shown in FIG. 2 as being supported on the horizontal reciprocable carriage 56 by two supporting block members 84 and 86. The supporting block member 84 houses a bearing member 88 which supports a hollow rotary stripper shaft 90 in such a manner that the rotary stripper shaft is rotatable within the block member 84. The hollow rotary stripper shaft 90 in turn supports the rotary stripper head 100 at its forward end and a pulley member 96 at its rearward end. The pulley member 96 is secured to the hollow shaft 90 for rotation therewith by a set screw 98. The hollow rotary stripper shaft 90 also houses an elongated plastic tube 92 which facilitates removal of insulation which has been stripped from the wire in a manner to be described hereinafter. A nylon spacer bushing 94 is located between the pulley 96 and the supporting block member 86.

Figure 3:
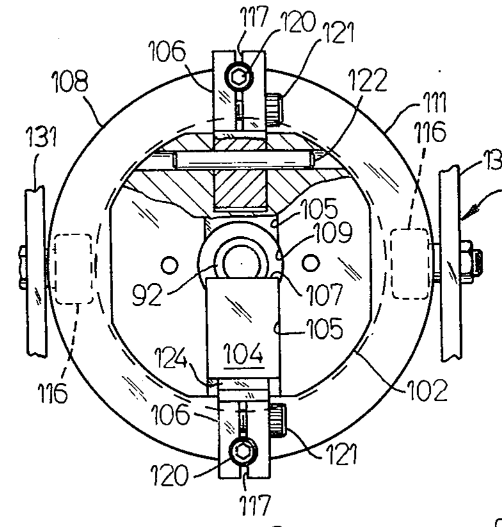
FIG. 3 is an enlarged end elevation view partly in cross-section and taken along line 3—3 in FIG. 2.
Figure 5:
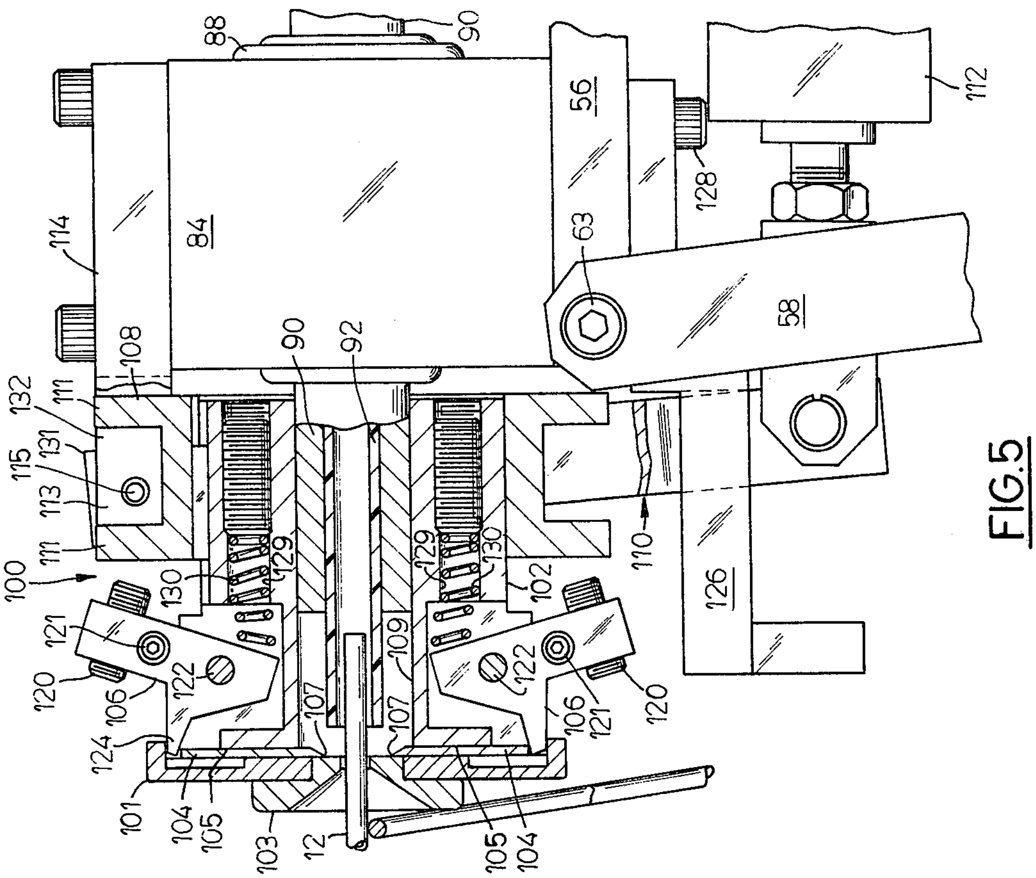
FIG. 5 is a view similar to FIG. 4 but showing the rotary stripper head when the blades are in a disengaged position.
Figure 4:
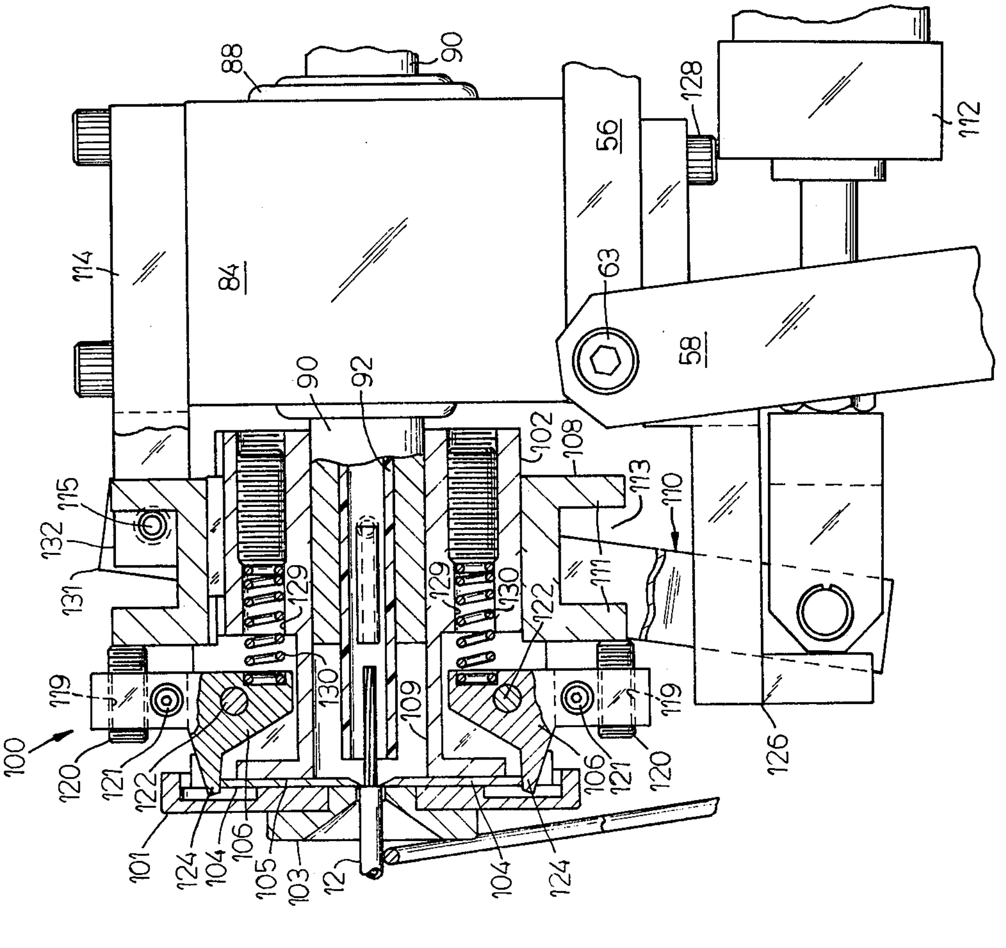
FIG. 4 is an enlarged partial cross-sectional view of the rotary stripper head in a wire stripping position.

The rotary stripper head 100 is best shown in FIGS. 4 and 5 as generally including a core member 102 which is rigidly secured to and rotatable with the shaft 90. The core member 102 defines a central chamber 109 for receiving the end of wire 12. The rotary stripper head also includes a front plate 101 and a funnel member 103. The core member 102 includes a pair of grooves 105 (FIG. 3), which in conjunction with front plate 101, receive a pair of opposed radially slideable blades 104. The blades 104 include a cutting edge 107 and can slide radially in the grooves 105 into cutting engagement with the insulation on wire 12.

The means for actuating the blades 104 includes the combination of a pair of camming members 106 which are pivotably mounted to the rotary stripper head core 102, and an axially slideable collar 108. The axially slideable collar 108 is received around the periphery of the core 102 and is actuatable to cause pivotal movement of the cam members 106 and consequent engagement of the blades 104 as shown in FIG. 4. Referring to FIG. 2, the collar 108 is driven axially by a pivotably mounted yoke 110 which is connected to a fluid actuated piston and cylinder 112. The yoke 110 includes a pair of upwardly extending arms 131 which are pivotably secured at their upper ends by a pair of pivot pins 115 which extend through the two upwardly extending arms 131 and through two forwardly extending projections 132 which are integrally connected to a rigid plate 114 which is in turn secured to the supporting block member 84. The lower end of the yoke 110 is pivotably secured to the end of a piston of the piston and cylinder 112 which is pivotably secured to the lower surface of the carriage 56 by a bracket 133. A freely rotatable bearing member 116 is provided intermediate the length of each arm 131 of the yoke 110, and is received between opposed flanges 111 of the collar 108. The bearing members 116 have a diameter which is slightly less than the width of the gap 113 between the flanges 111. The only surface to surface contact between the yoke 110 and the collar 108 is between the bearing members 116 and the flanges 111. This permits free rotation of the collar 108 within the yoke 110 without undue friction.

It will be readily apparent that actuation of the piston and cylinder 112 causing pivotal movement of the yoke 110 around pivot pin 115 will result in the bearings 116 applying an axial force on one of the flanges 111 to cause an axial sliding movement of the collar 108 with respect to the core member 102 of the rotary stripper head 110. Movement of the collar 108 from the position shown in FIG. 5 to the position shown in FIG. 4 will in turn cause the forwardly extending flange 111 of the collar 108 to contact the set screws 120 and to cause pivotal movement of the camming members 106 around pivot pins 122. Such pivotal movement of the camming members 106 will cause the camming projections 124 to force the cutting blades 104 radially inwardly to cut the insulation off of the end of the wire 12.

The length of the stroke of the hydraulic piston and cylinder 112, is limited by the stop member 126 which is secured to the carriage 56 by screws 128. The depth of the cut of the blades 104 into the insulation of wire 12 is also controlled by the set screws 120 such that wires having various diameters and thicknesses of insulation can be stripped by using the apparatus of the present invention. As best shown in FIG. 3, the cam members 106 include a slot 117 and a bore 119 for receiving the set screw 120. When the set screw 120 has been properly positioned for the desired depth of cut, a locking screw 121 can be tightened to prevent any movement of set screw 120.

The core member 102 also includes a pair of bores 129 for receiving springs 130 which are provided to cause the camming member 106 to return to the position shown in FIG. 5 after the wire stripping operation. When the collar 108 has been retracted by the piston and cylinder 112, the springs 130 apply a torque on the cams 106 causing them to pivot around pivot pin 122. The centrifugal force acting upon the blades 104 will then cause blades 104 to move radially outwardly away from the stripped wire.

It should be noted that the pulley member 96 and the pulley member 95 attached to the motor 78 are each provided with lands which are substantially wider than the pulley drive belt 97. The width of the lands thus permits reciprocating motion of the rotary stripper mechanism 54 without causing any substantial twisting of the drive belt 97.

The supporting block member 86 includes a threaded bore 87 therein for threadably receiving a nozzle member 89 and the rearward end of the tube 92. A source of fluid pressure is connected to the nozzle 89 to provide fluid flow through a bore 93 in the nozzle in a generally rearward direction. The rearward end of tube 92 projects into the bore 93 of the nozzle 89 such that fluid flows around the end of the tube 92 as it exits from the nozzle. As is readily apparent, rearward fluid flow through the bore 93 will thus cause fluid flow through the tube 92 sufficient to permit discharge of the waste insulation material from the rotary stripper head rearwardly through the tube 92 such that it can be ejected from the rotary stripping machine.

Operation

The wire stripping machine 10 of the present invention is intended to operate at a relatively high frequency so that insulation can be stripped from the ends of wires 12 with great rapidity. A single cycle of operation of the rotary stripper can be considered, for example, as being initiated when the various components of the stripping machine 10 occupy a position wherein the air cylinder 66 is fully extended and the carriage 56 is in a rearwardly disposed position to the right of that shown in FIG. 2. Under such conditions, a wire member 12 will have been advanced such that the wire member is held in a generally horizontal position with its end in a spaced relation with respect to the rotary stripper assembly 54.

The wire stripping cycle is initiated by retracting the air cylinder 66 such that the table 56 is moved to the position shown in FIG. 2. Simultaneously, the clamp locking assembly 80 is activated to engage the jaws 36 of the wire gripper to lock wire member 12 in a secured position. The operation of the clamp locking assembly 80 is more fully described in U.S. Application Ser. No. 557,618, filed Mar. 12, 1975 and now U.S. Pat. No. 3,921,472.

When the carriage 56 has been moved to the position shown in FIG. 2, the wire member 12 will be received in the central chamber 109 of the rotary stripper head in a manner shown in FIG. 5 with the extreme end of the wire projecting into the end of tube 92. The piston and cylinder 112 is then actuated to cause the yoke 110 to move from a position shown in FIG. 5 to a position shown in FIG. 4. This movement of the yoke 110 causes an axial sliding movement of the collar 108 and causes the flange 111 of collar 108 to contact the set screws 120 of the cam members 106. The collar 108 thus causes pivotal movement of the cam members 106 about the pivot pins 122 and causes the camming porjections 124 to force the blades 104 radially inwardly toward the wire member 12. Rotation of the rotary stripper head with respect to the wire 12 as the blades are being moved radially causes the blades 104 to cut through the insulation of the wire to a given depth as shown in FIG. 4.

With the blades in the engaged position as shown in FIG. 4, the carriage 56 can be reciprocated by the air cylinder 66 to the right to withdraw the rotary stripper head 100 away from the end of the wire. Axial movement of the engaged blades 104 with respect to the wire 12 will strip the cut insulation axially from the end of the wire. The air flow through the tube 92 caused by the injection of air through the nozzle 89 will cause movement of the stripped insulation through the tube 92 and ejection of the insulation through the nozzle 89.

The piston and cylinder 112 can then be retracted causing the yoke 110 to move the collar 108 rearwardly away from the cam members 106. The spring members 130 will then cause pivotal movement of the cam members 106 to the position shown in FIG. 5 and thereby releasing the blade members 104 such that the centrifugal force acting upon the blade 104 will cause them to move radially outwardly. The rotary stripper head will then be in position for the next cycle of operation.

Resume

A rotary wire stripping machine has been provided for stripping insulation and other material from the ends of various types of wire including coaxial cable. The present invention includes a simplified means for positively actuating the cutting blades and provides an improved means for discharging the insulation stripped from the wire. The invention also includes provision for very accurately adjusting the depth of cut of the insulation to be removed from the end of the wire so that wires of varying diameters and thicknesses of the insulation can be accommodated to form a neat, clean wire end. The stripping machine operates at very high speeds and in repeated cycles with the various operations being performed during each cycle. Such operations include clamping a wire, cutting material on the end of the wire, removing the cut material from the end of the wire, and all of said operations are carried out in timed relationship to each other.

The stripping machine of the present invention is a marked advance over the prior art because it is structurally less complicated and cumbersome, because it facilitates greater accuracy of the depth of the cut of the stripper blades, and because it accommodates easy access to these adjusting means avoiding the necessity of disassembly of the mechanism.

We claim:

1. A rotary stripping machine for stripping insulation from a wire said machine comprising a rotary stripping head supported for movement between a first position spaced a predetermined distance from an end of said wire having insulation material thereon to a second position adjacent to said end of said wire, said rotary stripping head being rotatable about an axis in general alignment with the axis of said wire, said head member including a chamber therein for receiving an end of said wire when said head is in said second position, blade means slideably supported in said member for rotation therewith, said blade means being radially movable into said chamber, and actuating means for forcing said blade means into cutting engagement with said insulation material, said actuating means including a collar slideably received upon said rotary stripping head member and camming means for forcing said blades into cutting engagement, said camming means including adjusting means for controlling the radial movement of said blades, said collar being axially slideable with respect to said rotary stripping head for actuating said camming means.

2. The machine set forth in claim 1, wherein said actuating means further includes a yoke means operably connected to said collar for causing axial sliding movement of said collar, and said yoke means operably connected to a fluid motor driving means.

3. The machine set forth in claim 2, wherein said yoke means includes a pair of arms received around said collar, said arms being pivotably secured at one end and connected at their other end to said fluid motor driving means and wherein said collar and said rotary stripping head rotate with respect to said yoke.

4. The machine set forth in claim 1, wherein said blade means includes a pair of opposed blades slideably mounted for radial movement into cutting engagement with said wire and wherein said camming means comprises a pair of cams, each of said cams being pivotably mounted to said rotary stripping head adjacent to one of said blades.

5. A rotary stripping machine for stripping insulation from a wire said machine comprising a rotary stripping head supported for movement between a first position spaced a predetermined distance from an end of said wire having insulation material thereon to a second position adjacent to said end of said wire, said rotary stripping head being rotatable about an axis in general alignment with the axis of said wire, said head member including a chamber therein for receiving an end of said wire when said head is in said second position, blade means slideably supported in said member for rotation therewith, said blade means being radially movable into said chamber, actuating means for forcing said blade means into cutting engagement with said insulation material, said actuating means including a collar slideably received upon said rotary stripping head member and camming means for forcing said blades into cutting engagement, said collar being axially slideable with respect to said rotary stripping head for actuating said camming means, and discharge means for expelling said waste insulation from said head member, said discharge means including a tube in general alignment with the axis of said wire and received within said chamber whereby a portion of the end of said wire may be received in said tube and including means for causing fluid flow through said tube.

6. The machine set forth in claim 5, wherein said actuating means further includes a yoke means operably connected to said collar for causing axial sliding movement of said collar, and said yoke means operably connected to a fluid motor driving means.

7. The machine set forth in claim 6, wherein said yoke means includes a pair of arms received around said collar, said arms being pivotably secured at one end and connected at their other end to said fluid motor driving means and wherein said collar and said rotary stripping head rotate with respect to said yoke.

8. The machine set forth in claim 5, wherein said camming means includes adjusting means for controlling the radial movement of said blades.

9. The machine set forth in claim 5, wherein said blade means includes a pair of opposed blades slideably mounted for radial movement into cutting engagement with said wire and wherein said camming means comprises a pair of cams, each of said cams being pivotably mounted to said rotary stripping head adjacent to one of said blades.

* * * * *